Sept. 19, 1939.  W. A. JOHNSON  2,173,687
MOWER CUTTING STRUCTURE
Filed May 2, 1938  2 Sheets-Sheet 1
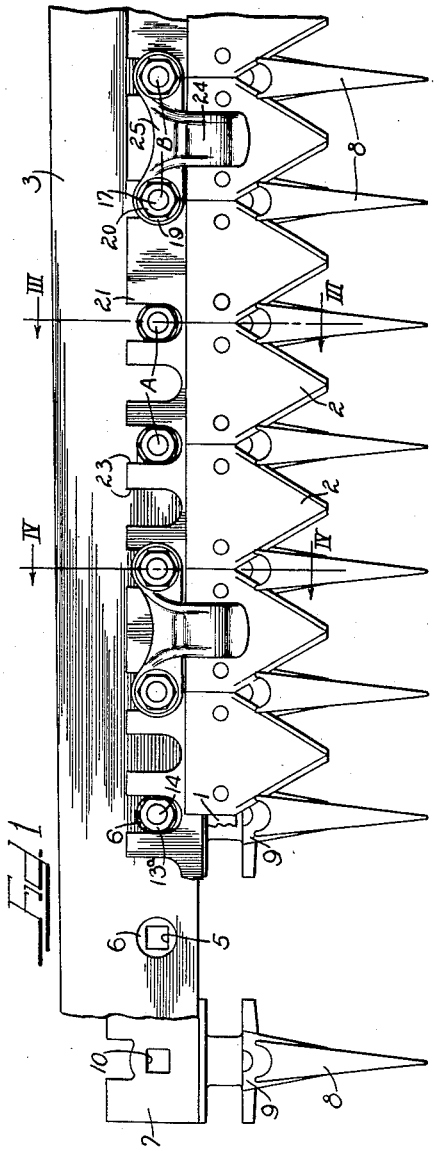
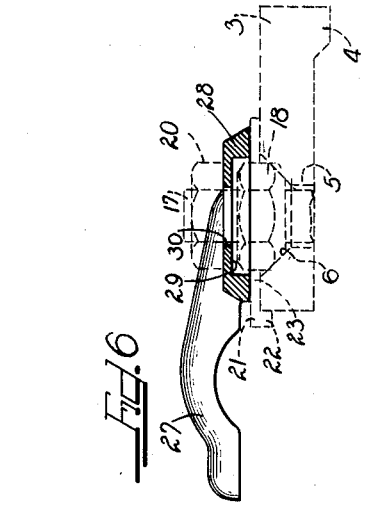
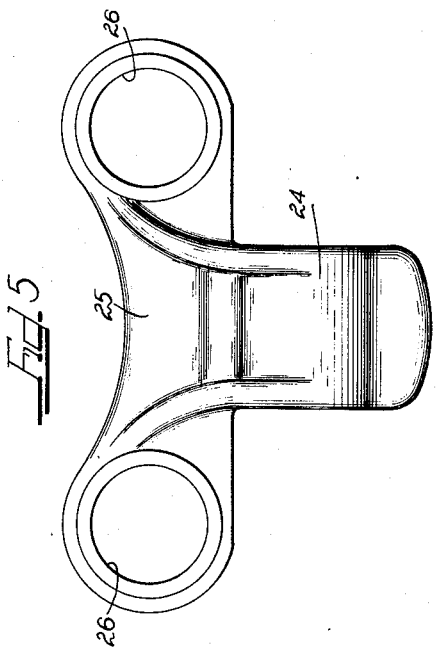
Inventor
WALTER A. JOHNSON

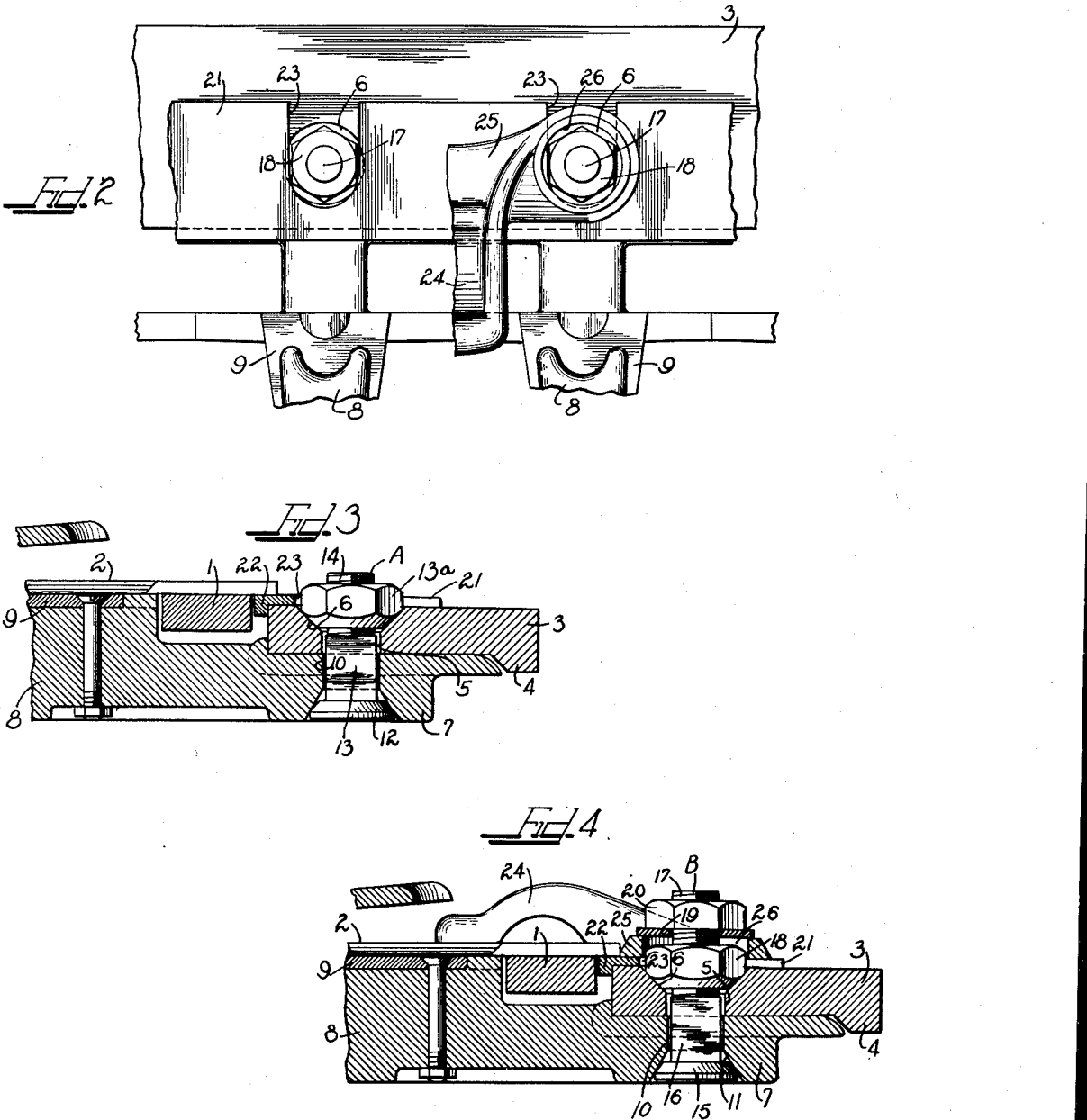

UNITED STATES PATENT OFFICE 2,173,687

MOWER CUTTING STRUCTURE

Walter A. Johnson, Rochester, Minn.

Application May 2, 1938, Serial No. 205,406

10 Claims. (Cl. 56—298)

It is well known that the major cause of cutting trouble with mowers and other similar harvesting machines, and requiring the frequent grinding of sickles, is the separation of the cutter blades. The present invention covers improvements in mower cutting structures to provide an improved apparatus for preventing the separation of the cutting blades, under ordinary cutting conditions, and the reduction of the separation of the blades where unusual cutting obstructives and conditions prevail. Furthermore, in present and old types of mower cutting structures it is necessary to remove all bolts holding the sickle clips before the wear plates can be removed, thereby completely disorganizing the whole cutting structure which is extremely difficult to reassemble by the ordinary farmer.

For the foregoing reasons, mower wear plates are often continued in use long after they are so badly worn that they become destructive to the sickle units and cause separation of the points of the cutter blades by the lowering of the rear ends of the cutter blades caused by contacting of the rear portions of the ledger plates.

This invention is devised to obviate the foregoing difficulties encountered with present types of mowers, by providing an improved mower cutting structure wherein the guard bar is provided with countersunk bolt openings for the reception of improved securing bolts which absolutely need not be loosened or removed for the removal of a continuous notched wear plate which is normally held in position by blade clips and auxiliary nuts engageable upon extending ends of the bolts with which the clips are associated.

It is an object of this invention to provide an improved type of mower cutting structure wherein all of the bolt openings in the guard bar are countersunk to receive the bolt nuts partially seated therein permitting portions of the nuts to project above the guard bar into a position to be engaged by a notched continuous wear plate which is secured in position by removable blade clips which in turn are removably held in place by means of auxiliary or outer nuts on the bolts with which the clips are associated, thereby providing a construction wherein the removal of the guard supporting bolts is unnecessary when it is desired to remove the continuous wear plate and the blade clips for replacement or repairs.

It is also an object of this invention to provide an improved type of mower cutting structure wherein the blade clips and the wear plate or plates may be removed for replacement or repairs without removing or even loosening the guard bolts.

It is a further object of this invention to provide a mower cutting structure wherein the blade or knife clips and the wear plate or plates are removably secured in position by means of auxiliary or secondary nuts engaged on the guard bolts with which the clips are associated.

Still another object of the invention is the provision of an improved type of mower cutting apparatus including an improved type of guard bar in which all of the bolt openings are countersunk for the partial reception of the guard bolt nuts which form part of improved bolts, the shank portions of which are provided with elongated square shank sections for projection not only through the square openings of the guards but long enough to project into the square openings provided in the guide bar to provide a structure wherein the guard bolts are materially strengthened and are relieved substantially of the torsional stresses and thrusts produced by the leverage depending upon the approximate length of the guards.

It is furthermore an object of this invention to provide a mower cutting apparatus wherein the blade clips are formed with enlarged openings engageable over main nuts of guard securing bolts, the threaded shanks of which are alongated for the reception of auxiliary bolts and washers for removably holding the clips in position, thereby affording a mower cutting apparatus wherein the blade clips may be removed by the removal of the auxiliary nuts and washers without removal or even loosening of the guard supporting bolts associated with the guard bar.

Another object of the invention is the construction of an improved type of mower cutter bar structure wherein double nut bolts are provided for rigidly securing the guards to a guard bar and for also removably securing wear plates and blade clips on the guard bar allowing removal and replacement of the wear plates and blade clips without disturbing the mounting of the guards.

It is an important object of this invention to provide a mower cutter bar structure wherein the guard bar is provided with all countersunk bolt openings permitting the nuts of the guard bolts to tightly seat in the countersunk portions of the openings permitting a notched continuous wear plate and a plurality of clips with enlarged openings to engage around the projecting portions of the nuts affording an arrangement whereby auxiliary or outer nuts are adapted to be used for releasably securing the clips and the wear plate in position to provide an arrangement which greatly tends to prevent the separation of the cutting blades, as well as reducing the necessity for frequent grinding of the sickles.

Other and further important objects of this invention will be apparent from the disclosures in the specification and the accompanying drawings.

The invention (in a preferred form) is illustrated in the drawings and hereinafter more fully described.

On the drawings:

Figure 1 is a fragmentary top plan view of a mower cutting structure embodying the principles of this invention.

Figure 2 is an enlarged fragmentary detail top plan of a portion of the mower cutting structure, with parts broken away and with parts omitted to clearly show detailed features of the invention.

Figure 3 is an enlarged fragmentary transverse detail section taken on line III—III of Figure 1, with the bolt member shown in elevation.

Figure 4 is an enlarged fragmentary transverse detail section taken on line IV—IV of Figure 1, with the bolt member shown in elevation.

Figure 5 is an enlarged top plan view of one of the blade clips removed from the cutter bar structure.

Figure 6 is a fragmentary transverse section through a mower cutting structure showing a modified form of blade clip.

As shown on the drawings:

This invention relates to improvements in an agricultural machine mower cutting structure and more particularly to improvements in the guard bar, the continuous one-piece wear plate, the blade clips, and improved means for securing said members together and for holding the guards on the guard bar independently of the mounting of the wear plate and the blade clips.

The mower cutting structure is adapted to be connected to a standard mower in the regular way, and the improvements to the cutting structure of the harvesting machine are associated with the cutter bar unit of the machine. The cutting unit of the machine is briefly disclosed as comprising a knife or blade bar 1, which is adapted to be reciprocated by the movement of the pitman, forming part of the agricultural machine. Bolted or otherwise rigidly secured side by side in abutting relationship with respect to one another are a plurality of cutting knives or blades 2. The shank portions of the knives or blades 2 are secured to the top side of the cutter blade bar 1 in a standard manner.

As illustrated in Figure 1, the cutting unit is associated with the cutter bar structure permitting the blades 2 to be associated with the mower guards and with the wear plate and blade clips. The mower cutter bar structure comprises a tapered metal guard bar 3, the enlarged end of which is adapted to be secured to the coupling yoke of the machine. Integrally formed along the back margin of the under side of the guard bar 3 is a stop flange 4. The tapered bar 3 is provided with a plurality of spaced bolt openings 5 which, as clearly illustrated in Figure 1, are square in cross section. The upper end of each of the bolt openings 5 is countersunk at 6.

Engaged against the under face of the guard bar 3 are the shank ends 7 of a plurality of mower knife guards 8, the shank ends 7 of which are positioned adjacent one another, as illustrated in Figure 1. Secured on each of the knife or blade guards 8 is a ledger blade 9. The shank portion 7 of each of the knife guards is provided with a square bolt opening 10. The lower end of each of the bolt openings 10 is countersunk at 11 (Figures 3 and 4).

The blade guards are so mounted on the bottom of the guard bar 3 that the bolt openings 10 are positioned to register with the bolt openings 5 in the guard bar. For rigidly securing the blade guards 8 in position on the guard bar 3, two types of securing bolt units are used, one type consisting of a short bolt unit designated A in Figure 3, while the other bolt unit is designated B and is illustrated in Figure 4. The bolt units A are of the short single nut type, while the bolt units B are of the long double or multiple nut type. The bolt units A and B are used in the grouped relation illustrated in Figure 1, or in any other similar arrangement depending on the type and size of the mowing machine on which bolts are used.

Each of the shorter type bolt units A comprises a head 12, a relatively long, square shank section 13 integral therewith, and a round threaded shank section 14. As illustrated in Figure 3, the short bolts project upwardly through the guard openings 10 and through the guard bar openings 5 with the head 12 of each bolt seated in the countersunk portion 11 of a bolt opening 10. The square shank section of the bolt projects through the square opening 10 of the guard and continues into the square opening 5 of the guard bar 3, to more securely hold the guards in proper association with the guard bar and to shorten the threaded portions 14 of the bolts so that the bolts are greatly strengthened and afford an arrangement which materially relieves the bolts of torsional strains. Each of the shorter bolts A is provided with a securing hexagonal nut 13a which is securely threaded on the threaded shank section 14 of the bolt so that the lower portion of the nut 13a projects into the countersunk opening 6 to rigidly hold the guard clamped on the guard bar and permitting a portion of the nut to project above the top surface of the guard bar 3, for a purpose hereinafter more definitely described.

The long bolt unit B, as clearly illustrated in Figure 4, comprises a head 15 having integrally formed thereon a square shank section 16 which is of a length sufficient to permit the same to project through the square opening in the guard and into the square opening 5 of the guard bar 3. Integrally formed on the square shank section 16 is a round exteriorly threaded shank section 17. Threaded on the shank section 17 is a main or primary hexagonal nut 18 which, when in its rigid clamping position, projects into the countersunk portion 6 of the guard bar 3 leaving a portion of the main nut projecting above the top surface of said guard bar. The main nut 18 is, therefore, sufficient to rigidly clamp and secure the respective blade guard 8 to the guard bar 3. Engaged on each of the threaded shank sections 17 of the long bolts is a washer 19 and an outer or secondary clamping nut 20. The nut members 18 and 20, while illustrated and described as being hexagonal, may, of course, be square or of any other desired shape. It will also be understood that while the bolt sections 13 and 16 are described and illustrated as being of square cross section, said bolt sections may also be hexagonal or of any other desired shape to fulfill the desired purpose.

In this improved form of mower cutting structure, the old method of providing a plurality of short wear plate units has been improved by replacing all of the old types of short wear plates by a single or one-piece sickle wear plate which is of substantially the same length as the guard bar 3. The improved wear plate unit consists of a long metal strip 21 having a stop flange 22 integrally formed on one longitudinal edge thereof. The longitudinal margin of the wear plate 21 opposite the flange 22 is provided with a plurality of transverse notches 23 which are arranged in grouped spaced relationship, as clearly illustrated in Figure 1, so that some of the notches 23 are spaced farther apart, while in other groups the notches 23 are arranged closer together. This particular spacing of the notches in the continuous wear plate affords an arrangement whereby the wear plate is adapted for substantially universal use on different sizes and styles of cutter bar units.

The continuous wear plate 21 is adapted to be seated upon the top surface of the front portion of the guard bar 3 with the stop flange 22 seated against the front edge of the guard bar, and with the notches 23 of the wear plate being of a size large enough to permit the same to engage around the projecting portions of the main securing nuts 13a and 18, as clearly illustrated in Figures 3 and 4. When the wear plate is engaged in position as described, the nuts 13a and 18 being of hexagonal shape so fit the notches 23 that said nuts cannot be rotated, thereby providing an arrangement which obviates the loosening of the guard securing bolts.

In the assembled form of the mower cutting structure, the rear shank ends of the knives or blades 2 of the cutting unit are adapted to ride upon the top surface of the continuous wear plate 21. Also associated with the knives or cutter blades 2 of the cutting unit, are a plurality of spaced knife or blade clips 24, each of which is provided with a base or mounting shank 25 having two large openings 26 provided therein, as illustrated in Figure 5, to permit the clips to be seated upon the top surface of the continuous wear plate 21 in a spaced relationship similar to that illustrated in Figure 1, so that the openings 26 may seat over the projecting portions of the main or inner nut members 18 of the long bolt units B. With the clip units thus positioned upon the wear plate, the washers 19 are engaged on the threaded shank sections 17 of the long bolts, and the auxiliary or outer nut members 20 are then threaded on the shank sections 17 to clamp the washers over the openings 26 to close the same and at the same time act together with the outer nuts 20 to rigidly clamp the clips and the continuous wear plate in position upon the guard bar 3.

It will thus be noted that the improved mower cutting structure is such that the guards 8 are adapted to be rigidly secured in position on the guard bar by means of the short bolts A and by means of the inner or primary nuts 18 and the long bolts B independently of the mounting of the one-piece wear plate and the blade clips. After the guards have been mounted in position, the one-piece wear plate is adapted to be supported upon the guard bar with the notches in the wear plate crotching around the nuts 13a and 18 of the guard bolts. The blade clips are then seated upon the continuous wear plate with the openings 26 engaging around the projecting portions of the main or inner nuts 18 (as clearly illustrated in Figure 4), after which the washers 19 are placed in position and the outer nuts 20 are threaded onto the threaded shanks 17 of the long bolt units. It will thus be noted that the blade clips on the continuous wear plate may be removed or adjusted by simply loosening the outer nuts 20 thereby affording an improved and simplified arrangement whereby the continuous one-piece sickle wear plate may be removed, replaced, or adjusted without disturbing the mounting of the guards on the guard bar and without interfering with the mounting of the nuts 13a and 18 on the short and long bolts respectively which are used to mount the guards on the guard bar.

Figure 6 illustrates a modified form of a knife or blade clip which is shown associated with parts of the mower cutting structure hereinbefore described. The modified form of clip comprises a blade arm 27, which is integrally formed on a base portion 28 having provided in the bottom face thereof two spaced nut recesses 29, the top closures of said recesses being provided with central openings 30 through which the threaded shank sections 17 of the long bolts are adapted to project when the blade clips are mounted in position upon the continuous wear plate similar to the arrangement illustrated in Figure 1. The continuous wear plate and the modified forms of the blade clips are secured in position by means of the outer or secondary nuts 20 of the long bolt units. The modified form of blade clips eliminates the need of the washers 19 in the arrangement illustrated in Figure 4. By providing the bolts A and B with elongated square shank portions, such as the portions 13 and 16, said portions of the bolts are permitted to project not only through the square openings of the mounting ends of the guards but are also permitted to project part way into the square openings provided in the guard bar 3, so that the guard bolts are not subject to the full amount of the "give" resulting from torsional strains to which the guard bolts are usually subjected.

By use of the improved mower cutting structure, on an agricultural mowing machine or the like, it is possible for the ordinary farmer to readily make any necessary replacements or adjustments of the one-piece sickle wear plate and of the knife or blade clips by himself without requiring expert service, for the reason that the adjustment of the wear plate and the blade clips may be done without disorganizing the cutting structure which is difficult to restore when once disturbed and requires hours of tedious labor with the old types of mower cutter bar structures in common use. The easy adjustment of the wear plate and the blade clips in the improved construction herein described and claimed obviates destructive wear to the blades and the blade bar and does away with uneven wear of the mower parts. The cutting structure is maintained in good operating condition with the improvements provided, so that openings between the points of the blades and the ledger blades are prevented thereby maintaining the cutting blades and the ledger blades in proper working association with one another since the lowering of the rear ends of the blades is obviated by use of the improved continuous wear plate and due to the ease with which the wear plate may be adjusted or replaced by the individual operating the mower. By maintaining the wear plate and blade clips in proper adjustment and repair, a mower cutting structure is provided in which the draught and breakage is reduced and in which the necessity for grinding the sickle is also reduced, since the cutters or blades are held in proper position so that they will shear perfectly from heel to toe so that the cutting structure can be made to last substantially as long as the motive units.

It will, of course, be understood that numerous details of construction may be varied through a wide range without departing from the principles of this invention, and it is, therefore, not the purpose to limit the patent granted hereon, otherwise than necessitated by the scope of the appended claims.

I claim is my invention:

1. An agricultural machine mower cutting structure including a guard bar having a plurality of bolt openings therein with each of said openings being countersunk, a plurality of guards, bolts engaging the guards and projecting through the countersunk openings in the guard bar, main nuts engaged on the bolts and partially seated in the countersunk portions of the guard bar openings, a continuous wear plate supported on the guard bar and having spaced notches therein engaging around the protecting portions of the main nuts, a plurality of blade clip members arranged in spaced relation on the wear plate and engaged on selected pairs of the bolts, said clip members having enlarged openings therein to seat over the projecting portions of the main nuts of the pairs of bolts, washers having bolt openings therein engaged over projecting ends of the pairs of bolts and closing the enlarged openings in the clip members, and auxiliary nuts engaged on the projecting ends of the pairs of bolts and coacting with said washers to releasably clamp the clip members and the wear plate on the guard bar and permitting removal of the clip members and the wear plate without disturbing the mounting of the guards on the guard bar.

2. An agricultural machine cutter bar structure including in combination a guard bar having countersunk openings therein, a plurality of guards, bolts projecting through the guards and through the openings in the guard bar, nuts engaged on the bolts and partially projecting into the countersunk openings in the guard bar leaving portions of the nuts projecting above the guard bar, a notched wear plate supported on the guard bar with the notches thereof engaged around the projecting portions of the nuts, and means engaged on the bolts for rigidly clamping the wear plate in place and releasable for removing the wear plate from the guard bar without loosening or removing the nuts and bolts or disturbing the mounting of the guards on the guard bar.

3. An agricultural machine mower cutting structure including in combination a guard bar having spaced countersunk bolt openings therein, a plurality of guards, bolts projecting through the guards and through the guard bar openings and including nuts seated in the countersunk openings and projecting slightly above the top of the guard bar, a sickle unit coacting with said guards, a wear plate on the guard bar and engaged by the sickle unit, said wear plate having notches therein engaged around the projecting portions of the nuts, clip means seated on the wear plate and having openings therein also engaged around the projecting portions of the nuts, and means for releasably holding the clip means and the wear plate secured in position and releasable to permit the wear plate to be removed, replaced or adjusted without loosening or removing the bolts and nuts and without disorganizing the cutting structure.

4. An agricultural machine mower cutting structure comprising a guard bar having countersunk bolt openings therein, a plurality of guards, bolts projecting through the guards and through the countersunk openings in the guard bar, nuts engaged on the bolts and seated in the countersunk openings in the guard bar and partially projecting above the guard bar, a wear plate having openings therein engaged over the projecting portions of the nuts, recessed means engaged on the bolts and seating over the projecting portions of the nuts, and auxiliary nuts engaged on the bolts for rigidly securing the recessed means and the wear plate in position and removable to permit removal, replacement or adjustment of the wear plate without disturbing the mounting of the guards on the guard bar.

5. An agricultural machine mower cutting structure including in combination a guard bar having countersunk bolt openings therein, a plurality of guards, bolts projecting through the guards and through the openings in the guard bar, main nuts engaged on the bolts for securing the guards in position, said main nuts partially projecting into the countersunk openings in the guard bar and partially projecting above the guard bar, an apertured wear plate seated on the guard bar and engaged over the projecting portions of the main nuts, apertured members engaged on the bolts and seated against the wear plate and enclosing the projecting portions of the main nuts, and secondary nuts engaged on the bolts for rigidly securing the apertured members and the wear plate in position on the guard bar, said secondary nuts adapted to be loosened or removed to permit adjustment or replacement of the wear plate without disturbing the main nuts or the guard bolts.

6. A mower cutting structure including in combination a guard bar having square bolt openings therein countersunk round at one end, a plurality of guards, bolts projecting through said guards, said bolts having elongated square shank portions and round threaded portions, said square shank portions projecting through the guards and part way into the square openings in the guard bar, and nut members threaded onto the projecting ends of the threaded shank portions of the bolts and seating in the countersunk ends of the bolt openings in the guard bar and partially projecting above the top surface of the guard bar.

7. A mower cutter bar structure including in combination a guard bar having countersunk bolt openings therein, a plurality of guards, a plurality of short bolts and long bolts projecting through the guards and through the guard bar, all of said bolts having elongated square shank portions projecting through the guards and part way into the openings in the guard bar, nut members engaged on the short bolts and seated in the countersunk portions of the guard bar openings and partially projecting above the top surface of the guard bar, main nuts engaged on the long bolts and seated in the countersunk portions of the guard bar openings and projecting above the top surface of the guard bar, a continuous wear plate on the guard bar having notches in one longitudinal margin thereof crotched around the projecting portions of the nut members of the short bolts and the main nuts of the long bolts to hold said nut members and the main nuts against rotation, blade clips engaged over the long bolts and having openings therein large enough to engage over the projecting portions of the main nuts on the long bolts, washers engaged over the long bolts and seated on the blade clips to cover the openings therein, and secondary nuts engaged on the long bolts to rigidly clamp the washers, the blade clips, and the wear plate in position on the guard bar and permitting removal, replacement, or adjustment of the blade clips and the wear plate without loosening or removing the nut members of the short bolts or the main nuts of the long bolts.

8. A mower cutter bar structure including in combination a guard bar having square bolt openings therethrough, a plurality of guards having square openings therein, and bolt members projecting through the guard openings and through the openings in the guard bar for securing the guards on the guard bar, said bolt members having elongated square shank portions forming a part thereof and projecting through the square openings of the guards and part way into the square openings of the guard bar to strengthen the bolts and reduce torsional strains thereon.

9. In a mower cutter bar structure a guard bar, a plurality of guards engaged against one surface thereof, bolts projecting through the guards and through the guard bar for holding the guards in position, inner nut members engaged on the bolts for holding the guards and the guard bar assembled, a wear plate and a blade clip mounted on the guard bar and having openings therein engaged around the inner nut members of the bolts, and outer nut members engaged on the bolts for releasably securing the wear plate and the blade clip in position on the guard bar and permitting adjustment or removal of the wear plate and the blade clip independently of any adjustment of the inner nut members and without disorganizing the mounting of the guards on the guard bar.

10. A mower cutter bar structure including in combination a guard bar having square openings therein countersunk at one end, a guard having a square opening therein countersunk at one end, and means for securing the guard to the guard bar, said means comprising a bolt head seated in the countersunk portion of the guard opening, a square section integral with the bolt head and projecting through the square opening in the guard and part way into the square opening in the guard bar, a threaded shank portion integral with the square shank portion projecting through the square opening in the guard bar and through the countersunk end of said opening, and a nut member engaged on the threaded shank portion and seated in the countersunk end portion of the guard bar opening.

WALTER A. JOHNSON.